United States Patent [19]

Lambert

[11] 3,989,323

[45] Nov. 2, 1976

[54] COMPOSITE BEARING ASSEMBLIES

[75] Inventor: Roy E. Lambert, Englewood, Fla.

[73] Assignee: FMC Corporation, San Jose, Calif.

[22] Filed: May 12, 1975

[21] Appl. No.: 576,763

[52] U.S. Cl. .............................. 308/74; 308/207 R
[51] Int. Cl.² ........................................ F16C 13/00
[58] Field of Search .............. 308/3 R, 25, 15, 36.1, 308/207 R, 74

[56] References Cited
UNITED STATES PATENTS

| | | | |
|---|---|---|---|
| 555,510 | 3/1896 | Hyatt | 308/207 |
| 890,735 | 6/1908 | Van Doren | 184/87 |
| 1,184,614 | 5/1916 | Brightman | 308/25 |
| 2,336,915 | 12/1943 | Anderson | 308/124 |
| 2,518,338 | 8/1950 | Lampe | 308/36.1 |
| 2,897,017 | 7/1959 | Kubodera | 308/15 |
| 3,693,226 | 9/1972 | Howe, Jr. | 29/148.4 R |

Primary Examiner—M. H. Wood, Jr.
Assistant Examiner—Gene A. Church
Attorney, Agent, or Firm—J. F. Verhoeven; J. W. Edwards; C. E. Tripp

[57] ABSTRACT

A bearing assembly has a load supporting segment that is made of a good bearing material supportive of the load thereon. The load supporting segment is positioned transversely of a shaft in a location to support the shaft. A shaft retaining segment that is made of a different material is positioned transversely of the shaft on a shaft side opposite from the load supporting segment for holding the shaft rotatably therebetween to bear upon the load supporting segment. A plurality of such bearing assemblies are manufactured by machine finishing the interior surfaces of an annular metal shape, separating the shape into a plurality of load supporting segments, molding a plastic material into a plurality of shaft retaining segments, and assembling each shaft retaining segment with a complementary load supporting segment.

14 Claims, 11 Drawing Figures

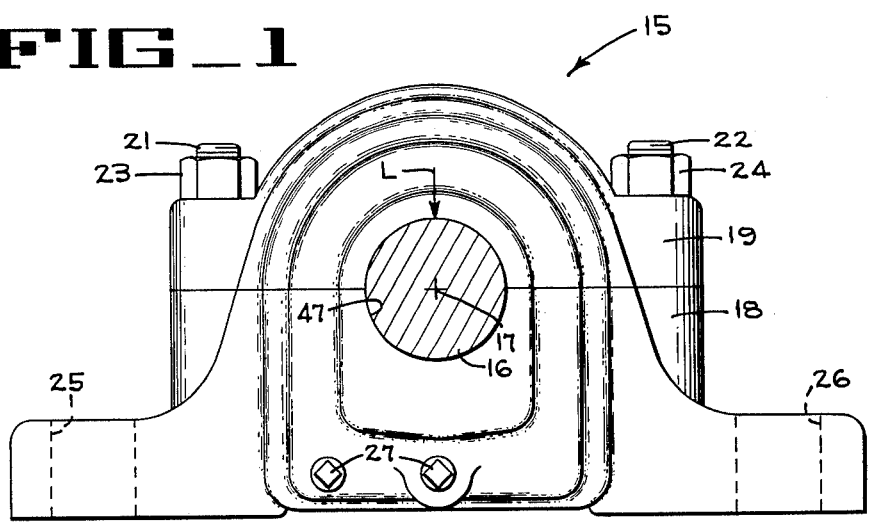
FIG_1
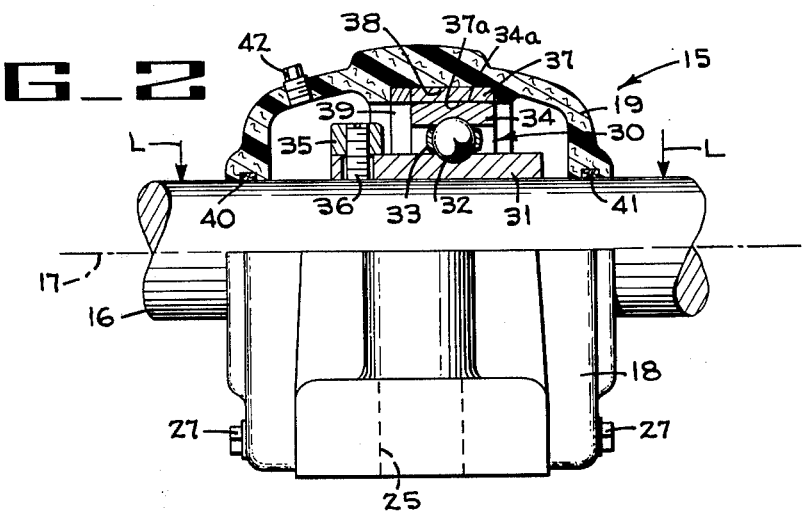
FIG_2
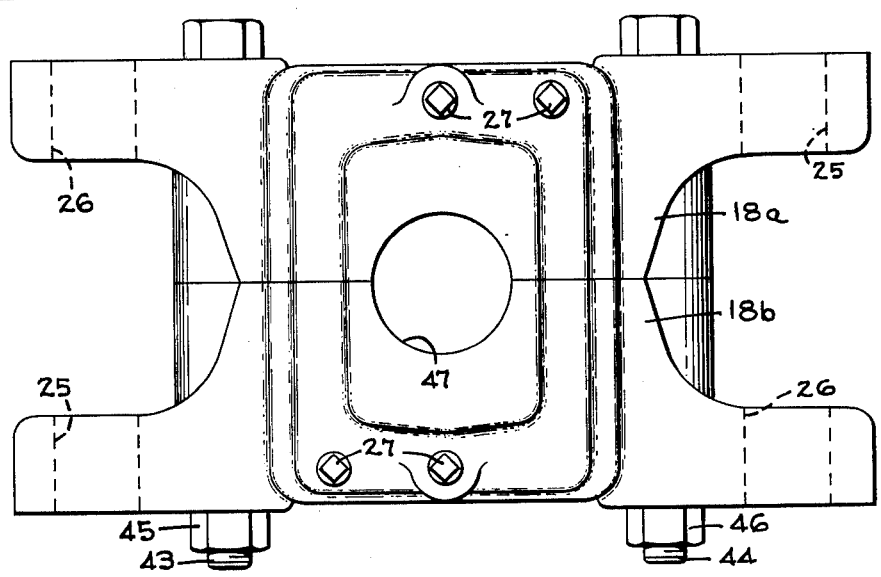
FIG_3

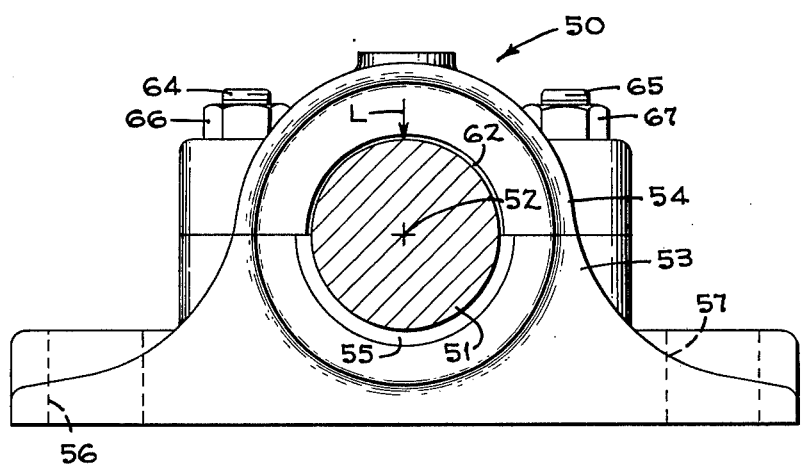
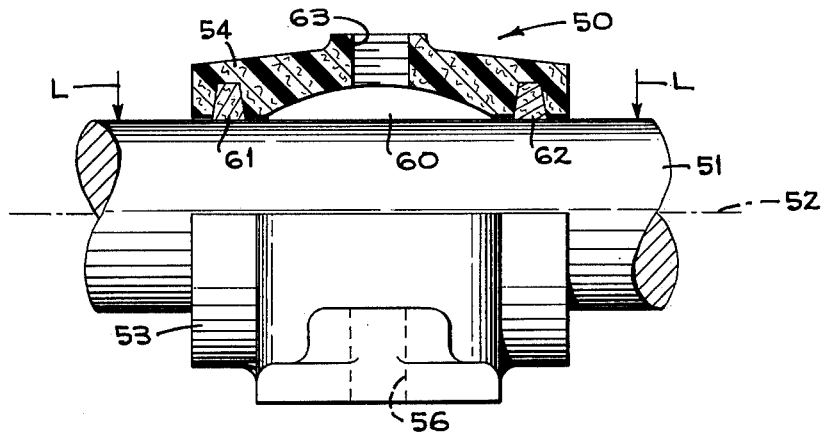
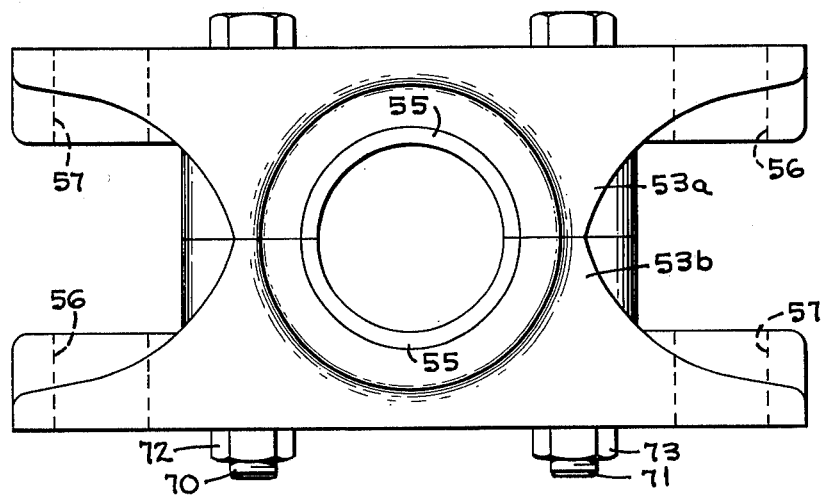

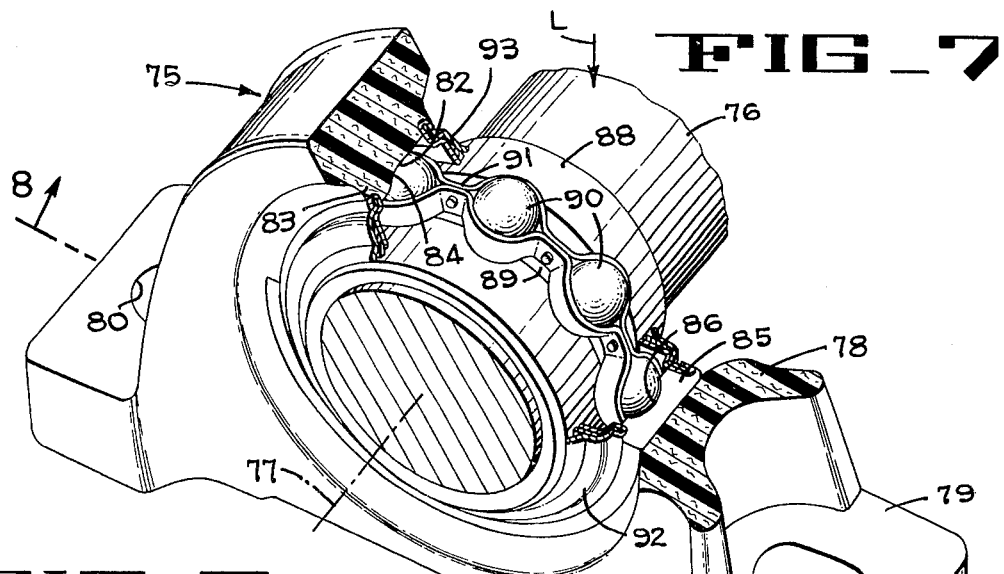
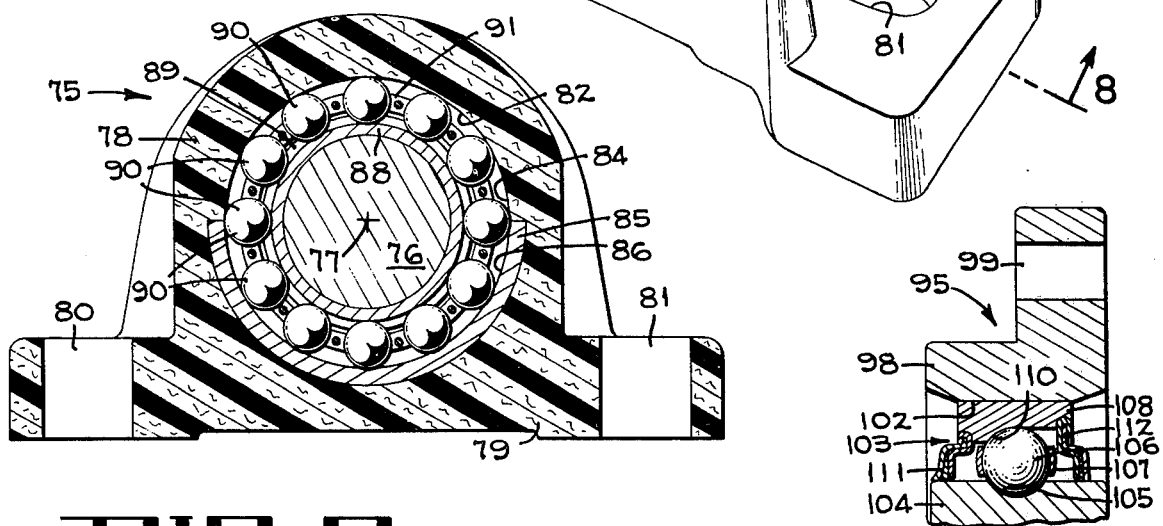
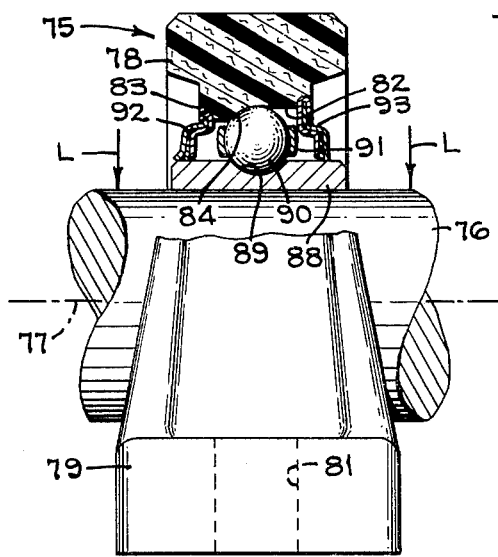
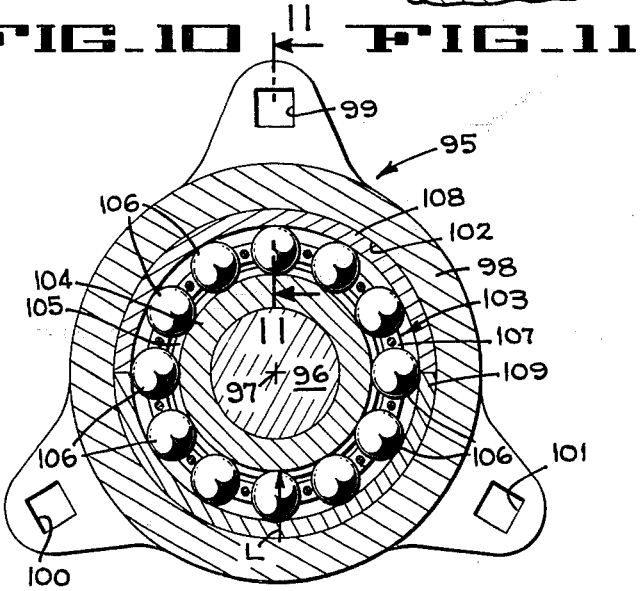

COMPOSITE BEARING ASSEMBLIES

BACKGROUND OF THE INVENTION

1. Field of the Invention

This invention relates to composite bearing assemblies for rotatable shafts and to methods of manufacturing such bearing assemblies. More specifically, the invention pertains to an annular bearing member having a plurality of arcuate segments that are made of different material with the segments being arranged circumferentially about a rotatable shaft for supporting the shaft.

2. Description of the Prior Art

Annular bearing members for supporting rotatable shafts concentrically within the bearing members have been made as solid rings and also have been made of, or split into, a plurality of segments that are assembled circumferentially about a shaft. Normally, the entire ring is made of one kind of suitable bearing material and bearing surfaces within the ring are accurately machine finished.

An arcuate pillow block bearing that extends through an arc of about 270° with an opening at the top of the bearing is shown in U.S. Pat. No. 2,897,017 for rotatably supporting a shaft. The entire shaft load is supported by the lower portion of the bearing. U.S. Pat. No. 1,184,614 shows a semi-circular bearing plate that is open at the top and supports the lower half of a rotatable spool with the entire spool load being carried by the bearing plate. Pillow block bearings having lubrication chambers in the top portion of the bearing are shown in U.S. Pat. Nos. 890,735, 2,336,915 and 2,518,338.

U.S. Pat. No. 555,510 shows an outer race segment that extends through an arc of about 270° for supporting anti-friction bearings. The remaining 90° of arc, being located at the top of the outer race, is defined by a cover. A saddle supports the outer race segment and the only connection between the saddle and the cover is the outer race segment. U.S. Pat. No. 3,693,226 recognizes that significant savings in race material can be realized by using a small metal outer race facing a set of anti-friction bearings and being embedded in a plastic material that is less expensive than the metal outer race material.

SUMMARY OF THE INVENTION

Engineering recommendations frequently provide that loading upon a rotatable shaft bearing be limited to a predetermined direction, such as downward. Under such loading conditions, the shaft load is carried by the lowermost arcuate portion of the bearing that extends through an arc angle of about 120°. The remaining upper portion of the bearing merely retains the shaft in position upon the lowermost arcuate bearing portion. Substantial savings can be achieved by using a good bearing material only in the lower load supporting segment of the bearing (either in direct contact with the shaft or to support a liner or antifriction members surrounding the shaft) and using a different, more economical, material for the upper bearing portion holding the shaft in place thereon.

A plurality of composite bearing assemblies that each form a support ring about a rotatable shaft can be difficult to manufacture if the arcuate segments forming the assemblies are made of different materials having different finishing requirements. Segments that are molded can be formed to a desired shape but segments made of good bearing material must be machine finished. According to one feature of the present invention the interior surface of an annular metal shape is machine finished and then separated into a plurality of load supporting segments. A plastic material is molded into a plurality of shaft retaining segments that are assembled with the complementary load supporting segments for supporting the shaft.

BRIEF DESCRIPTION OF THE DRAWING

FIG. 1 is a front view in elevation of a composite bearing assembly embodying the present invention.

FIG. 2 is a right side view, with the top portion being shown in section, of the bearing assembly shown in FIG. 1.

FIG. 3 is a front view in elevation illustrating two base pillow block portions that are bolted together for machine finishing of interior surfaces.

FIG. 4 is a front view in elevation of a modified form of composite bearing assembly embodying the present invention.

FIG. 5 is a right side view, with the top portion being shown in section, of the bearing assembly shown in FIG. 4.

FIG. 6 is a front view in elevation illustrating two base pillow block portions that are bolted together for machine finishing of interior surfaces.

FIG. 7 is a perspective view of another modified form of composite bearing assembly embodying the present invention with an upper quadrant broken away to shown underlying structure.

FIG. 8 is a section taken on the line 8—8 of FIG. 7.

FIG. 9 is a right side view, with the top portion being shown in section, of the bearing assembly shown in FIG. 7.

FIG. 10 is a sectional view of a further modified form of composite bearing assembly embodying the present invention.

FIG. 11 is an enlarged section taken on the line 11—11 of FIG. 10.

DESCRIPTION OF THE PREFERRED EMBODIMENTS

With reference to FIG. 1, a composite bearing assembly 15 is shown for supporting a rotatable shaft 16. The shaft is subjected to loading in a predetermined direction, such as the downwardly direction indicated by the arrows L. The elongated shaft has an axis 17 about which the shaft rotates. The load applied to the shaft is transversely thereof and normal to the shaft axis. The composite bearing assembly is in the form of a split housing pillow block that includes a base portion 18 and a cap portion 19.

The base portion 18 of the split-housing pillow block is positioned transversely of the shaft 16, on the bottom side of the shaft opposite to the direction of load application as indicated by the arrows L, for supporting both the shaft and the load thereon. Thus, the base portion is made of a good bearing material, such as cast iron or steel, that will provide adequate support and can be machine finished for accurate shaft alignment. The cap portion 19 of the split-housing pillow block is positioned transversely of the shaft side opposite the base portion and holds the shaft in place upon the base portion. Since the cap portion is not required to support the shaft and load, as does the base portion, the cap portion is made of different material, such as molded plastic reinforced with fiberglass. Such material is lighter in weight and costs less than cast iron. The cap portion fits about bolts 21 and 22 that project upward from the base portion and the cap portion is held in place upon the base portion by nuts 23 and 24 that are threadably fitted upon the bolts 21 and 22, respectively. Slotted bolt holes 25 and 26 are provided within the base portion for mounting the base portion upon a supporting structure, not shown. The bottom surface of the base portion is machined for accurate alignment of the shaft 16. A pair of drain plugs 27 are threadably fitted into each side of the base portion for draining the interior of the split housing pillow block.

Looking now at FIG. 2, an anti-friction bearing component 30 fits within the split-housing pillow block formed by the base portion 18 and the cap portion 19. The bearing component includes an inner race sleeve 31 that fits about the shaft 16, a set of ball type anti-friction bearings 32 that are positioned within a guide cage ring 33, and an outer race ring 34. Fitting about one end of the inner race sleeve is a collar 35 that has internally threaded radial openings in which set screws 36 are positioned to project through a sleeve opening and to contact the shaft 16. Thus, the inner race sleeve is locked in position both axially and radially on the shaft. The inner race sleeve and the outer race ring have opposed concave surfaces defining raceway grooves for receiving the set of ball type anti-friction bearings. The outer race ring has a convex surface 34a that seats upon a concave surface 37a of an aligning ring 37 and is held in place axially thereon by the curvature of the abutting concave and convex surfaces. The aligning ring seats within a recess bore 38 in both the base portion and the cap portion of the split-housing pillow block and is held axially in place within the recess bore by a locking ring 39. Seals 40 and 41 fit about the shaft and within seal grooves in both the base portion and the cap portion. A lubrication fitting 42 fits through an opening in the cap portion for inserting lubrication to the shaft and bearing component.

When manufacturing the composite bearing assemblies 15, two cast base portions 18a and 18b are fastened together, as shown in FIG. 3, by bolts 43 and 44 having nuts 45 and 46, respectively, threaded thereon. The base portions abut on split surfaces of each portion for common machine finishing within a bore opening 47 that is defined between the base portions. Such machine finishing includes boring the recess bore 38 and the grooves for seals, similar to seals 40 and 41, shown in FIG. 2. After the machine finishing has been completed, the bolts 43 and 44 are removed and the base portions 18a and 18b are separated. The cap portions 19 are molded individually and if any finishing is required, the cap portions can be bolted together while such finishing is being done. Then, a cap portion 19, an anti-friction bearing component 30, a shaft 16 and a base portion 18 are assembled with the base portion positioned transversely of the shaft to support the bearing component, the shaft and the cap portion.

By making the base portion 18 of a good bearing material such as cast iron or steel and the cap portion 19 of a different material, such as molded plastic reinforced with fiberglass, savings in material cost and in labor cost for machine finishing can be achieved along with a reduction in weight of the bearing assembly. Machine finishing of semi-circular base portions can be made efficient by bolting two base portions together to form an annular shape and then finishing each semi-circular base portion simultaneously.

A modified form of composite bearing assembly 50 is shown in FIG. 4 for supporting a rotatable shaft 51. The shaft is subjected to loading in a predetermined direction as indicated by the arrows L in FIGS. 4 and 5. The shaft rotates about an axis 52 and the load, as represented by the arrows L, is applied transversely of the shaft and normal to the shaft axis. This composite bearing assembly is in the form of a split pillow block that includes a base portion 53 and a cap portion 54.

The base portion 53 of the split pillow block is positioned transversely of the shaft 51 on the bottom side of the shaft opposite to the application of load thereon, as indicated by the arrows L. The base portion, that supports the shaft and the load, is made of a good bearing material such as cast iron or steel. Such material will provide adequate support and can be machine finished for accurate shaft alignment. A half-sleeve liner 55, located within the base portion, provides a bearing surface for supporting the shaft and this sleeve is made of a good bearing material such as babbitt or bronze. Slotted bolt holes 56 and 57 are also provided within the base portion for mounting the base portion upon a support structure, not shown. The bottom surface of the base portion can be machine finished for accurate alignment of the shaft.

The cap portion 54 of the split pillow block is also positioned transversely of the shaft 51 but on the shaft side opposite from the base portion 53. Since the cap portion merely holds the shaft in place upon the base portion and between the split pillow block portions, it is made of a material, such as molded plastic reinforced with fiberglass. This material costs less and is lighter in weight than the cast iron or steel used to make the base portion. A grease reservoir 60, as shown in FIG. 5, is formed within the cap portion and is located about the upper half of the shaft. Seals 61 and 62, made of felt or other appropriate material, contact the shaft at each end of the grease reservoir to limit grease flow from the reservoir to a downwardly route that leads into the space between the lower half of the shaft and the half-sleeve liner 55. Thus, the grease supports the shaft within the half-sleeve liner before escaping therefrom axially of the shaft to repel contaminants and to form a grease collar. A threaded opening 63 is provided in the cap portion for a suitable lubrication fitting, not shown, through which grease can be inserted into the lubrication chamber. The cap portion has bolt openings therein to fit about bolts 64 and 65 that project upward from the base portion and the cap is held in place on the base portion by nuts 66 and 67, respectively.

To manufacture the base portions 53 of the bearing assemblies 50, two cast base portions 53a and 53b are bolted together as shown in FIG. 6. Long bolts 70 and 71 fit through the bores wherein the bolts 64 and 65 are subsequently fitted. Nuts 72 and 73 are threadably fitted upon long bolts 70 and 71, respectively, to lock the base portions together in abutting relationship along the split surfaces of each base portion. The half-sleeve liner 55 is cast in place between the base portions when made of babbitt and when made of bronze, the liner is installed between the base portions. The interior surfaces of the liner are bored and machine finished. Then, the liner is split and the base portions are separated.

The cap portions 54 are molded individually in appropriate forms and threads are cut into the opening 63. A lubrication fitting, not shown, is installed within the opening and seals 61 and 62 are inserted into the formed seal grooves. Each cap portion is then assembled with a mating base portion 53 to provide a bearing assembly 50.

Savings in material cost and finishing labor are achieved by molding the cap portion 54 of the composite bearing assembly 50, while the base portion 53 is cast and lined for supporting the load. This composite bering assembly weighs less than a corresponding assembly made entirely of cast iron and makes less noise during operation. The grease chamber 60 that is formed within the cap portion enables a supply of grease to be maintained about the shaft 51 and the half seals 61 and 62 limit grease flow in an axial direction along the upper half of the shaft. Thus, grease is forced downward into the load zone between the shaft and the half-sleeve liner 55 to support the shaft. No seals are provided at the ends of the half-sleeve liner and grease is expelled therefrom to repel contaminants and to form a grease collar seal.

Another modified form of bearing assembly 74 is shown in FIGS. 7–9 for supporting a rotatable shaft 76. A load is applied to the shaft in a downward direction, as indicated by the arrows L. This direction is transverse to the shaft and generally normal to the shaft axis 77 about which the shaft rotates. In this embodiment, a solid or one-piece housing pillow block 78 is made of a molded plastic material reinforced with fiberglass. The pillow block has a mounting base 79 that includes slotted bolt holes 80 and 81 which receive bolts, not shown, for attaching the pillow block to a support surface. An opening 82 is provided in the housing pillow block and along the upper half of the opening is an outer race segment 83 that is formed integrally within the pillow block to define a raceway groove 84.

Another outer race segment 85 is made of a good bearing material such as bronze and machine finished. One complete annular outer race is cast and machine finished in a standard manner and then split into a plurality of segments. Normally such segments are slightly less than half of the finished annular outer race. It would be possible to split an annular outer race into three segments, each segment having an arc angle of about 120 degrees, and use each segment as an outer race segment 85 providing the outer race segment 83 extended through an arc angle of 240° in a location at the top of the opening in the housing pillow block 78. The outer race segment 85 is positioned within the housing opening 82 on a side of the shaft 76 opposite from the application of load to the shaft. Thus, the outer race segment 85 provides support for the loaded shaft and this segment is keyed against rotational movement about the shaft within the housing opening by the molded outer race segment 83. The outer race segment 85 defines a raceway groove 86, shown in FIG. 7, that complements the raceway groove 84.

An inner race ring 88 fits about the shaft 76 and a raceway groove 89 is machined in the outer surface of the race ring. Such a raceway groove could be machined directly in the shaft 76 and the inner race ring omitted. The inner race ring is locked to rotate with the shaft by a set screw, not shown. A set of ball type anti-friction bearings 90 fit within the raceway grooves 84, 86 and 89. These bearings are maintained in spaced relationship by a guide cage ring 91. Lip seals 92 and 93 are mounted in the pillow block 78 on opposite sides of the set of anti-friction bearings 90 to protect the bearings.

The load upon the shaft 76 is transmitted through the anti-friction bearings 90 to the outer race segment 85 and the other outer race segment 83, that is an integral part of the pillow block 78, is not subjected to direct bearing stress. Thus, outer race segment 83 can be made of molded plastic material with the raceway groove 84 formed therein. Savings are achieved both in material costs and in labor costs for machine finishing. The composite bearing assembly 75 is lighter in weight than a corresponding bearing assembly made entirely of cast iron.

A further modified form of bearing assembly 95 is shown in FIGS. 10 and 11 for supporting a rotatable shaft 96. A load is applied to the shaft in an upward direction, as indicated by the arrow L in FIG. 10. This direction of load is transversely of the shaft and generally normal to a central axis 97 about which the shaft rotates. In this embodiment, a three bolt flanged unit housing 98 is cast in one piece from material such as aluminum or plastic reinforced with fiberglass. Bolt holes 99, 100 and 101 are provided for mounting the housing to a support, not shown. An opening 102 is provided in the housing for receiving the shaft 96 and an anti-friction bearing component 103.

The anti-friction bearing component 103 has an inner race sleeve 104 that fits about the shaft 96 with a concave inner raceway groove 105 located in the outer surface of the sleeve. The sleeve is positioned axially on the shaft and attached thereto by a set screw, not shown. It will be understood that the sleeve could be omitted and the inner raceway groove machined directly into the outer surface of the shaft. A series of balltype anti-friction bearings 106 fit circumferentially about the inner raceway groove and are rotatably held in spaced relationship by a guide cage ring 107. An outer raceway is formed by a bearing race segment 108 that is made of a good bearing material such as bronze and by a molded race segment 109 that is made of a softer material, being lighter in weight than bronze, such as cast aluminum or molded plastic reinforced with fiberglass.

To provide versatility in the orientation of housing 98 for mounting to a support and to enable accommodating shafts loaded in any one direction normal to the shaft, the molded race segment 109 can be turned within the housing to a position on the same side of the shaft as the application of load thereon and locked in such position by a set screw, not shown. The bearing race segment 108 can then be slid axially into place and is keyed against rotation within the housing by the molded race segment. The bearing race segment has a machine finished raceway groove 110 that is open on one side to enable the bearings 106 to slip axially therein and this raceway groove complements a corresponding raceway groove that is formed within the molded race segment. The formed raceway groove does not need to be machine finished since the material is softer and the bearings will wear the groove to a proper configuration. Lip seals 111 and 112 fit within notches in the outer race segments and contact the outer surface of the inner race sleeve 104 on each side of the bearings to protect the bearings.

By using only a semi-annular bearing race segment 108 made of good bearing material and a molded race segment 109 of softer material that is lighter in weight, material costs and machine finishing costs are lowered.

The material of which the housing 98 is made provides for sound absorption and a reduction of bearing noise. The bearing assembly 95 is lighter in weight than conventional flanged units made of malleable iron or formed steel.

Although the best mode contemplated for carrying out the present invention has been herein shown and described, it will be apparent that modification and variation may be made without departing from what is regarded to be the subject matter of the invention.

What is claimed is:

1. A composite bearing assembly for an elongated shaft to which a load is applied in a predetermined direction transversely of the shaft, said bearing assembly comprising a load supporting segment that is made of a good bearing material, said load supporting segment being positioned transversely of the shaft on a shaft side opposite from the application of the load thereto for supporting both the shaft and the load, and a shaft retaining segment being made of a material different than the load supporting segment and being positioned transversely of the shaft at a location that is opposite from the load supporting segment for holding the shaft in place between the segments.

2. In a bearing assembly for an elongated shaft to which a load is applied in a direction normal to the shaft axis, a load supporting segment being made of a material supportive of the load thereon and being positioned transversely of the shaft on a shaft side opposite to the application of load thereon for rotatably supporting the loaded shaft, and a shaft retaining segment being made of a different material than the load supporting segment and being positioned transversely of the shaft on a shaft side opposite from the load supporting segment for holding the shaft rotatably in place to bear upon the load supporting segment.

3. In a bearing assembly for an elongated shaft to which a load is applied in a predetermined direction normal to the shaft, a split pillow block base portion that is made of a load supportive material having good bearing qualities, said base portion being positioned transversely of the shaft on a side thereof opposite to the application of load thereon for supporting both the shaft and the load, and a split pillow block cap portion that is made of a different material than the base portion with qualities that facilitate economy by molding to shape without machine finishing, said cap portion being positioned transversely of the shaft on a side thereof opposite from the base portion for holding the shaft in place between the split pillow block portions.

4. A split pillow block as described in claim 3 wherein the base portion is made of a metal such as cast iron and the cap portion is made of a molded plastic material.

5. A split pillow block as described in claim 4 wherein the base portion has a segmental recess bore machined therein for receiving an anti-friction bearing assembly.

6. A split pillow block as described in claim 4 wherein the base portion has seal grooves machined therein.

7. A split pillow block as described in claim 3 wherein the cap portion defines a grease reservoir that is located about the upper half of the elongated shaft which extends in a substantially horizontal direction, and the base portion has a half-sleeve bearing surface supporting the shaft.

8. A split pillow block as described in claim 7 wherein the cap portion has seals for contacting the upper half of the shaft adjacent each end of the grease reservoir to limit grease flow from the reservoir to a downwardly route that leads into the space between the lower half of the shaft and the half sleeve bearing surface before escaping therefrom axially of the shaft.

9. A split pillow block as described in claim 7 wherein the half sleeve bearing surface is machine finished bronze.

10. A split pillow block as described in claim 7 wherein the half sleeve bearing surface is machine finished babbitt.

11. In a bearing assembly for a rotatable shaft to which a load is applied in a direction normal to the axis of rotation of the shaft, a housing with an opening therein for receiving the shaft, a set of anti-friction bearings fitting circumferentially about the shaft for rotatably supporting the shaft within the housing, and an outer race formed by a plurality of segments fitting circumferentially about the bearings within the housing, one outer race segment being made of a good bearing material and having a raceway groove machine finished therein for receiving said bearings, said segment being located on a side of the shaft opposite to the application of the load thereto, and another outer race segment being made of molded material with a raceway groove formed therein to complement the raceway groove in the first outer race segment.

12. In a bearing assembly as described in claim 11, said housing being made of molded material and said molded outer race segment being formed integrally within the housing.

13. In a bearing assembly as described in claim 12, said outer race segment made of a good bearing material being insertable axially into the housing opening together with the set of anti-friction bearings and the shaft end, said molded outer race segment locking the other outer race segment made of a good bearing material against rotational movement about the shaft.

14. In a bearing assembly as described in claim 11, said molded outer race segment being formed separately of the housing and said outer race segments being adjustable circumferentially within the housing opening to position the outer race segment made of a good bearing material in a load supporting position.

* * * * *

UNITED STATES PATENT OFFICE
CERTIFICATE OF CORRECTION

PATENT NO. : 3,989,323
DATED : November 2, 1976
INVENTOR(S) : Roy E. Lambert

It is certified that error appears in the above-identified patent and that said Letters Patent are hereby corrected as shown below:

Column 3, line 67 after "made" insert --more--.

Column 5, line 10 change "bering" to --bearing--.

Signed and Sealed this

Twelfth Day of April 1977

[SEAL]

Attest:

RUTH C. MASON
Attesting Officer

C. MARSHALL DANN
Commissioner of Patents and Trademarks